April 19, 1966  W. Z. HOLM  3,246,631
AUTOMATIC MILKING BARN
Filed Oct. 17, 1963  5 Sheets-Sheet 3

INVENTOR.
WILLIAM Z. HOLM
BY Naylor & Neal
ATTORNEYS

INVENTOR.
WILLIAM Z. HOLM
BY Naylor + Neal
ATTORNEYS

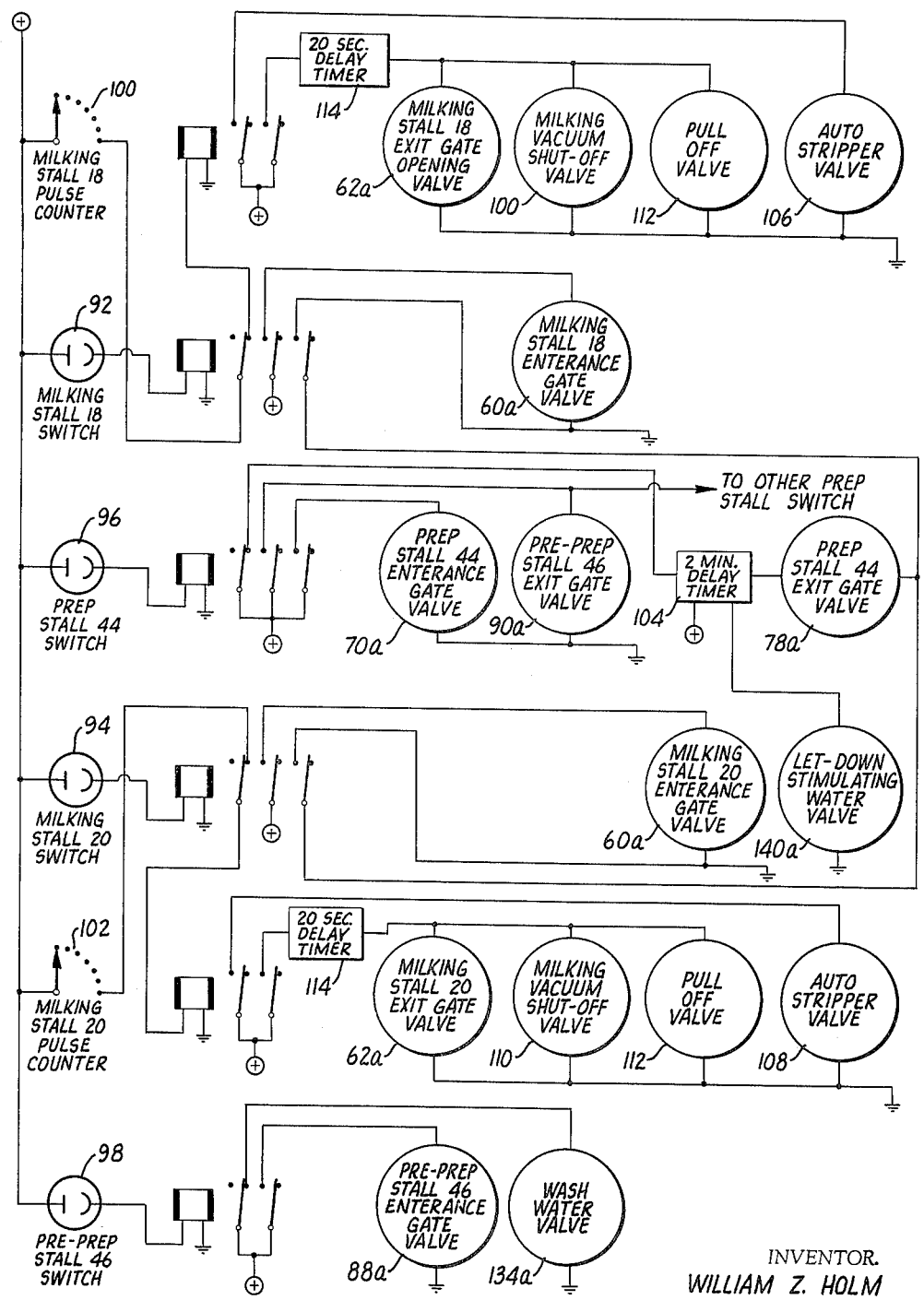

United States Patent Office 3,246,631
Patented Apr. 19, 1966

3,246,631
AUTOMATIC MILKING BARN
William Z. Holm, 120 Howard St., Petaluma, Calif.
Filed Oct. 17, 1963, Ser. No. 316,835
15 Claims. (Cl. 119—14.03)

This invention relates to apparatus for milking cows and more particularly to improvements in automatic milking barns where a large herd of cows can be milked very rapidly by a single man.

One of the most important problems encountered in the operation of dairy farms is the problem of obtaining sufficient personnel who are skilled in milking cows. Skilled operators are able to satisfy the cow's need for a habitual milking procedure, and at the same time provide the variations in milking procedure which individual cows require. Some cows must be milked with particular care, either because of disease or because they habitually require longer or shorter milking periods for maximum production. During recent years, I have conducted a substantial amount of work in designing automatic milking parlors to relieve this problem and permit a single operator to handle larger herds.

The basic approach toward this automation involves complete automation in those areas where the cows appear to accept automation and controlled automation in those areas where the cows appear to require more individual attention. This automation involves both the use of automatic machinery and the proper arrangement of the machinery in a barn or parlor to permit the cows to become accustomed to automation and adapt their habits to the environment of an automated farm.

Of course, a young herd will accept an automated milking system much more readily than will an older herd, and certain procedures can be employed with heifers which are detrimental with older cows which have become accustomed to the special care which they receive from a skilled operator. Nevertheless, these automated procedures have proven very successful and have produced very substantial increases in production and reduction in disease with both young and old herds.

In this work I have done I have obtained a good balance between fully and partially automated procedures by employing variable automatic equipment in the actual milking of the cow, and using fully automatic equipment for the preparation and feeding of the cow. The preparation equipment is controlled by the milking equipment to supply cows to the milking equipment as they are needed, and the preparation and milking stalls are arranged efficiently to accustom the cows being automatically prepared to the milking operations which follow. The preparation and milking stalls are also arranged to provide an efficient flow of cows through the barn while retaining each cow in the various stalls for optimum intervals, and the arrangement is adaptable for herringbone type parlor barns.

Preferably, this integration of fixed automatic and variable automatic equipment employs the milking equipment and apparatus shown in Clegg Patents Nos. 2,886,000; 2,888,034; 2,949,883; and 2,966,800. This apparatus, and particularly the milk meter shown in Patent No. 2,949,883, permits the actual operation of milking the cow to be controlled by the individual cow's milking habits while permitting other operations to be rigidly automated and efficiently coupled with the milking operation.

The Clegg apparatus gives an indication of the rate of milk flow during milking, and in my apparatus, I can employ this rate indication provided by Clegg's equipment to strip and discharge milked cows automatically and to initiate sequential movement of cows through preparation operations. In this way a single operator may milk an entire herd very rapidly while he is required to do no more than inspect the cows, place the milking claw on them and observe their progress through milking (the term claw is used herein as a generic designation of the various units used to engage the cow's teats).

Preparation and prefeeding of the cow is accomplished in fully automatic manner, and has been successful in providing efficient stimulation for the cow for letdown immediately prior to milking so that the cow gives milk immediately, thereby avoiding delays in the milking stalls and the disease dangers incident to application of the milking claw to the cow while the teats are not lubricated by milk flow.

When the use of this preparation apparatus is coupled with my automatic stripping and discharge apparatus, this "dry milking" of the cow can be substantially eliminated both at the beginning and at the end of milking so that very appreciable improvements in the health of the herd can be seen. This is particularly the case as far as the elimination of mastitis is concerned.

Other features and advantages of this invention will become apparent from the following description read in conjunction with the attached drawings in which.

Figure 1:
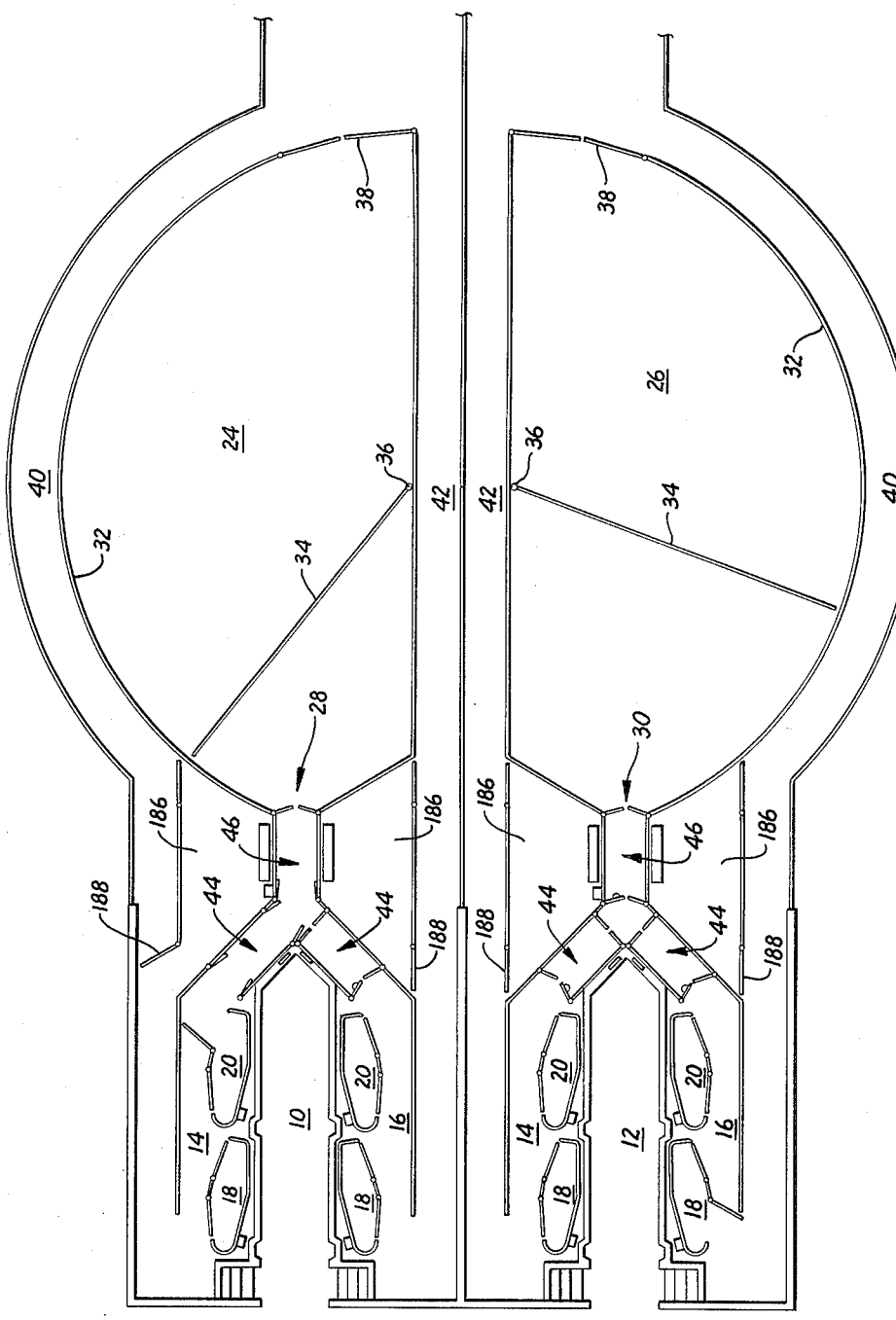
FIG. 1 is a plan view of a milking barn or parlor constructed in accordance with this invention.
Figure 2:
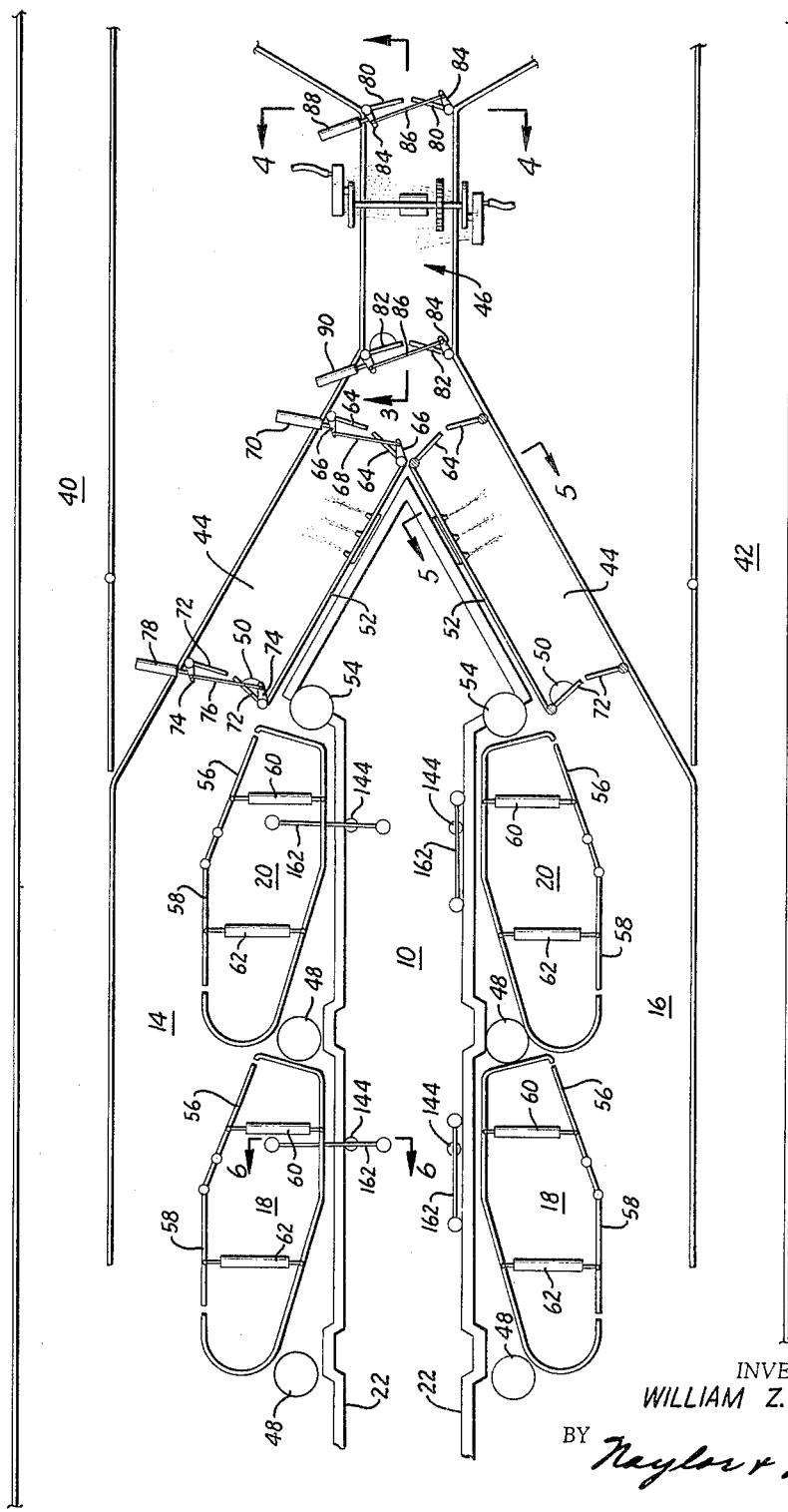
FIG. 2 is a plan view on an enlarged scale of one of the milking areas in the barn shown in FIG. 1.
Figure 3:
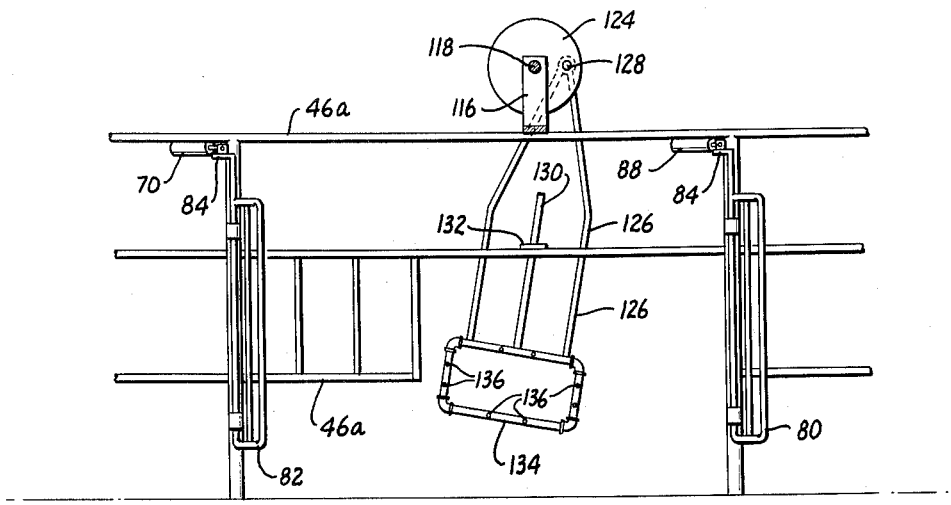
Figures 4, 5:
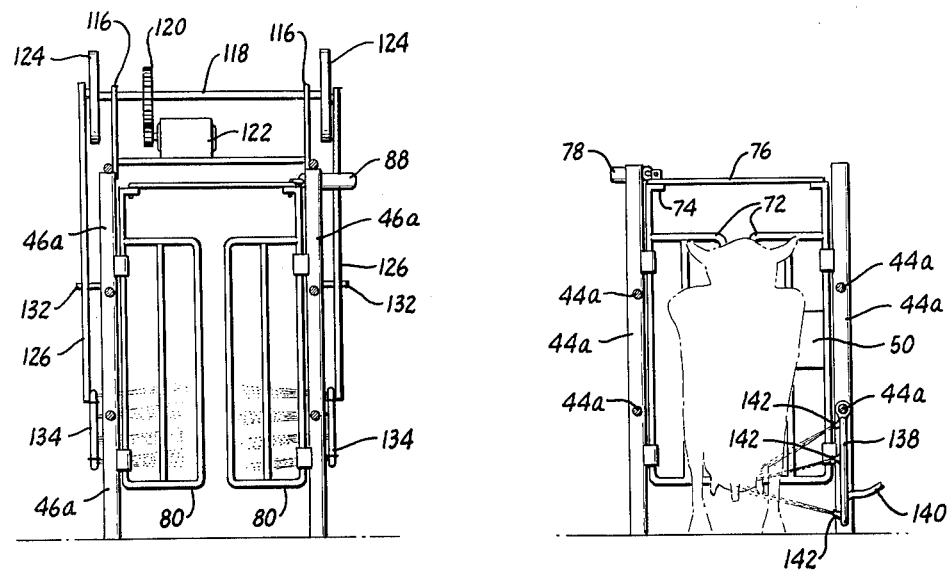
Figure 6:
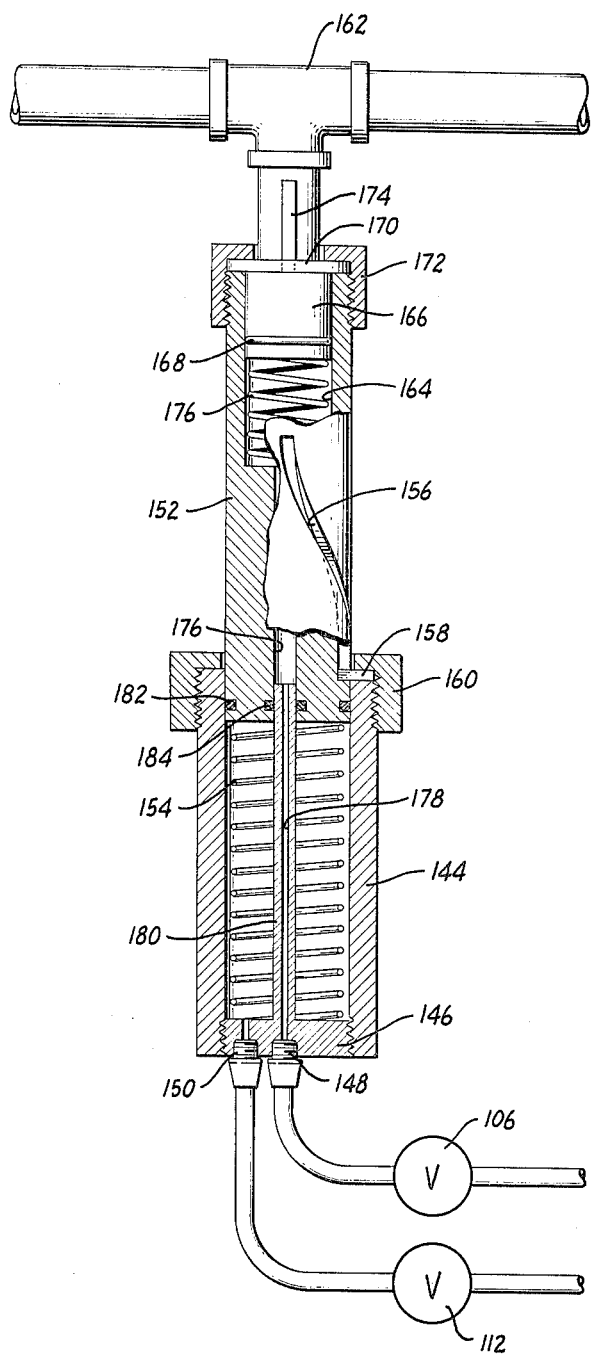

FIGS. 3, 4, and 5 are vertical sectional views of the apparatus of FIG. 2 taken along the planes indicated at 3—3, 4—4, and 5—5 in FIG. 2, respectively;

FIG. 6 is a sectional view through one of the milking mechanisms of FIG. 2 taken along the plane indicated at 6—6 in FIG 2; and FIG. 7 is a wiring diagram illustrating the controls employed in the apparatus of FIG. 1.

Referring now in detail to the drawings and particularly to FIGS. 1 and 2, the barn illustrated therein has a pair of operator's pits 10 and 12 with a pair of milking aisles 14 and 16 extending along opposite sides of each of the pits. A pair of milking stalls 18 and 20 are positioned end to end in each of the aisles 14 and 16 adjacent to the edge of the pit. The pit is surrounded by an inclined curb 22 which prevents cows in the stalls 18 and 20 from slipping into the pit, the curb having a top surface which is inclined downwardly toward the stalls 18 and 20.

With reference to FIG. 1, the two milking stations which are provided by and around the pits 10 and 12 are employed with two semicircular corrals 24 and 26 with the corrals having entrance openings 28 and 30, respectively, by which cows pass from the corrals into the two milking areas. The corrals are conveniently made of pipe rail fences 32 and preferably a swinging crowd gate 34 is pivotally mounted in each corral at 36 to crowd cows toward the entrance gates 28 and 30. The corrals have gates 38 by which cows may be admitted from the pasture, and each corral is surrounded by return aisles 40 and 42 by which cows may return from each of the milking areas to the pasture.

A Y-shaped passageway is provided for conducting cows from each of the entrance gates 28 and 30 to the milking aisles 14 and 16, and gates (mentioned below) divide each Y-shaped passageway into a pair of preparation stalls 44 on the arms of the Y shape and a preprepa ration stall 46 on the base of the Y shape. Apparatus (illustrated in FIG. 3) is mounted adjacent to the prepreparation stall 46 for washing cows with a spray of cold water as they enter the milking parlor and stimulating apparatus (illustrated in FIG. 5) is mounted adjacent to each of the preparation stalls 44 for spraying the cow's udder with a warm stream of fluid and preferably compact streams of warm water which massage the udder, to stimulate the cow for letdown prior to milking.

The apparatus is also provided with means for automatically feeding the cows as they move through the milking parlor, but this apparatus does not form an essential part of this invention and is illustrated in the drawings only schematically. In this regard, feed dispensing units 48 are mounted adjacent to the front of each of the milking stalls 18 and 20 for dispensing feed into a manger in the front of the stall. As is known in the art, the feed may be dispensed into the manger of each stall responsive to the quantity of milk which is given by the cow in the stall so that the cow is first given an increment of feed and then given further quantities of feed responsive to milk production so that "heavy milkers" are given extra feed. Conveniently, each extra increment of feed is supplied responsive to the operation of the above-mentioned Clegg apparatus when that apparatus expells a pound of milk. Feeding means is also provided in each of the preparation stalls 44 so that the cow is pre-fed prior to milking, and in this regard a manger 50 is mounted on one of the exit gates of each of the preparation stalls 44 and swings through the inner wall 52 of the preparation stall to receive an increment of feed from an automatic hopper 54 each time the exit gates of the preparation stall are opened.

Each of the milking stalls 18 and 20 is provided with an entrance gate 56 and an exit gate 58 which are controlled by vacuum operated rams 60 and 62, respectively, the rams being constructed to be spring-loaded toward a gate closing position and operated by vacuum to open the gates.

Each of the preparation stalls 44 has a pair of entrance gates 64 which are interconnected by crank arms 66 and a link 68, and a vacuum operated ram 70 is connected to one of the crank arms 66 for opening the gates. The ram 70 is constructed in the same manner as the rams 60 and 62 with the gates 64 spring-loaded toward a closed condition. In this regard, it has been found that it is advantageous to construct the gates in this manner and with the gates somewhat inclined to the center line of the stall as shown in FIG. 2 and opening in a direction toward the direction from which cows approach the gate; this manner of construction permits the use of rigid stops on the gates which support the gates when the cows press forwardly against them, and the cows' heads and necks may protrude through the space between the two gates while still permitting the gates to be opened by minimum power vacuum cylinders.

In a similar manner, the exit ends of the preparation stalls 44 are provided with exit gates 72 interconnected by crank arms 74 and a link 76 with the gates being power operable by a spring-loaded vacuum cylinder 78.

The prepreparation stall 46 has a pair of entrance gates 80 and a pair of exit gates 82 with the gates of each pair interconnected by crank arms 84 and a link 86 and with each pair of gates power operable by spring-loaded vacuum cylinders 88 and 90.

The vacuum rams 60, 62, 70, 78, 88 and 90 are connected to solenoid valves (indicated by corresponding numerals and the letter "a" in FIG. 7) by which each ram is operated to open its gate when an electric current is connected to the solenoid valve to connect the ram to a source of vacuum. The control system which is indicated in FIG. 7 for operating these valves is a 12 volt direct current system which may be used in a barn without danger of shocks and the points in the control circuit indicated plus (+) are connected to the positive side of the 12 volt system and the grounded points are connected to the negative side; a two-lead system is preferably employed to further eliminate the danger of electrical shocks.

With further reference to FIG. 7, an electrical switch 92 is employed in each of the milking stalls 18, and similar switches 94, 96, and 98 are provided in each of the milking stalls 20, the preparation stall 44, and the prepreparation stall 46. These switches may take any suitable form for sensing the presence of a cow in the stall and operating an electrical circuit when a cow is present in the stall; in FIG. 7, these switches are indicated as photoelectric cells, but the photoelectric cells may be replaced by electrical switches operated by wands which project into the stall, or the switches may be actuated by treadles on the floor of the stall which open switches when a cow walks into the stall.

Also indicated in FIG. 7 are electrical pulse counters 100 and 102 which are employed in connection with the milking apparatus in each of the stalls 18 and 20, respectively, to initiate opening of the stall gates automatically when the milking of a cow in the stall has been concluded. In this regard, applicant employs in connection with the Clegg apparatus mentioned above, a red flashing light mounted adjacent to each milking stall and connected to a timer (not shown) by which the flashing light is turned on when a predetermined time period elapses without operation of the Clegg apparatus to expel a pound of milk. In the apparatus illustrated in FIG. 7, the pulse counters 100 and 102 are connected to the flashing red lights at the milking stalls 18 and 20 to count a predetermined number of flashes of the flashing red light and then automatically initiate a sequence for releasing the cow being milked from the milking stall.

The elements 92–102 are connected to relays as illustrated to operate the stall gate valves and a two minute delay timer 104 is connected to the control valve 78a for the preparation stall 44 exit gate to assure that a cow remains in the preparation stall for a period of two minutes.

Additional elements are provided in the control circuit of FIG. 7 for controlling termination of the milking cycle for each cow in one of the milking stalls.

Thus, auto-stripper valves 106 and 108 are operated by the pulse counters 100 and 102 respectively, and a milking vacuum shutoff valve 110 and a pulloff valve 112 is operated by each of the pulse counters 100 and 102 through a twenty second delay timer 114. As will appear hereinafter, the auto-stripper valve 106 and the pulloff valve 112 in each milking stall operates in connection with the apparatus of FIG. 6 to conclude the milking cycle of each cow and remove the milking claw from the cow automatically.

With reference to FIGS. 2–4, apparatus is provided adjacent to the prepreparation stall 46 for automatically washing a cow in this stall with the spray of cold water. In FIGS. 3 and 4, the structural members which define the prepreparation stall 46 are indicated by reference numerals 46a and frame members 116 are mounted on top of the stall members 46a and support a rotatable shaft 118. A drive gear 120 (FIG. 4) is mounted on the shaft 118 and driven by an electric motor 122 and a pair of drive wheels 124 are mounted on opposite ends of the shaft 118 at the opposite sides of the stall 46. A pair of frames 126 are suspended from eccentric drive pins 128 on the wheels 124, and an intermediate strut 130 on the frame 126 is slidably received in a bracket 132 on the stall walls 46a so that the frame 126 rocks back and forth as it is raised and lowered by the drive wheels 124. A generally rectangular spray head 134 is mounted on the lower end of each of the frames 126 and is provided with a plurality of spray nozzles 136 which spray streams of water onto the opposite sides of a cow in the prepreparation stall 46, washing the cow in areas including its udder. The water spray from the washing heads 134 may be operated continuously but it is generally preferable that it be operated intermittently so that it is turned off at the time when a cow must walk into the prepreparation stall. In this regard, a solenoid valve 134a (FIG. 7) is operated by the prepreparation stall switch to discontinue the flow of water to the washing head 134 when the prepreparation stall entrance gates 80 are opened.

With reference to FIGS. 2 to 5, apparatus is provided adjacent to each of the preparation stalls 44 for automatically stimulating the cow to letdown prior to milking so that milk is present in the cow's teats as soon as the milking claw is applied, and tissue damage through "dry milking" is avoided. In FIG. 5, the structural members which define the preparation stall 44 are indicated by reference characters 44a. At the inside of the preparation stall 44 there is mounted a closed rectangular loop of pipe 138 having a fitting 140 which may be connected to a source of warm water and also having a group of right water discharge nozzles 142 which are constructed to deliver confined streams of water directed as indicated in FIG. 4 to impinge upon the cow's udder and stimulate the cow for letdown prior to milking. Best results are obtained when the fluid sprayed from the nozzles 142 is warm water (warmer than the wash water employed in the spray heads 134) and where the streams of water emanating from the nozzles 142 are relatively confined and hence create a massaging action as they impinge upon the cow's udder through radiant heat and ultra violet lamps may be used. This automatic stimulation for letdown is preferably terminated approximately thirty seconds before the cow moves to one of the milking stalls 18 and 20, and for this reason the water supply fitting 140 is connected to a solenoid valve 140a (FIG. 7), and the valve 140a is connected to the two minute delay timer 104 so that the valve 140a is opened during the third thirty second period of the two minute delay which is controlled by the timer 104. In this way the cow may be admitted to the preparation stall 44 and pre-fed for about two minutes while she is stimulated for letdown during the third half minute interval in the stall.

Referring now to FIGS. 2 and 6, the apparatus illustrated herein is adapted for automatic removal of the milking claw from the cow when the cow ceases to give milk. In this regard, this apparatus is used with the apparatus shown in the above-mentioned Clegg patents where the milking equipment itself gives a measure of the flow of milk from the cow being milked. With the Clegg apparatus, the flow measure is provided by periodically expelling a pound of milk which has been collected from the cow, and the time interval which elapses between operations of the Clegg apparatus indicates the flow rate of which the cow is giving milk and the time at which the flow of milk decreases. As indicated above, the Clegg apparatus is employed in connection with a flashing red light which goes on when a predetermined time interval elapses after the last pound of milk is delivered by the apparatus and which warns the operator that a cow has ceased to give milk and the claw should be removed. In practice, it has been found that the timer which starts operation of the flashing red light is preferably set to start operation of the red light when about twenty seconds elapses after the Clegg apparatus expels a pound of milk where a second pound of milk is not expelled in that twenty second interval.

As indicated above, the control circuit shown in FIG. 7 may be connected to the flashing red light employed with this Clegg apparatus so that flashes of the red light index the pulse counters 100 and 102 to positions where the pulse counters energize their corresponding relays. Additionally, pulse counters like the counters 100 and 102 may be employed in lieu of the red light and timer by providing timing pulses to the pulse counters 100 and 102 and a connection between the pulse counters and the associated Clegg apparatus to reset the pulse counters to zero each time the milking apparatus expels a pound of milk. Obviously, other switch means may also be employed for closing the relays which are here operated by the pulse counters 100 and 102, but it is preferable to employ the arrangement illustrated since the red lights are helpful to the operator and since the arrangement is then easily adapted to the use of manually overriding switches by which the operator can take over from the automatic controls and adapt the automatic sequencing to the barn conditions which he sees.

In the automatic apparatus which is used herein means are provided for removing the milking claw from the cow automatically after the cow stops giving milk. In conjunction with automatic removal of the claw, the cow is automatically stripped to remove milk from pockets of the udder which may have become trapped during milking and to compensate for tissue shrinkage and up-crawling of the claw during milking. This automatic stripping is accomplished by stretching the udder a predetermined distance during a twenty second period after the milking apparatus indicates that the claw should be removed and before the claw is actually pulled off. The twenty second time delay while the udder is stripped is provided by the delay timer 114 which delays the opening of valves 62a, 110, and 112 for a period of twenty seconds after the opening of valve 106.

The apparatus by which the cow is automatically stripped and the claw is then automatically removed is shown in FIG. 6 where a base cylinder 144 is mounted in the operator's pit adjacent to the rear end of each of the milking stalls and carries a plug 146 in its bottom which carries two fittings 148 and 150 by which conduits are connected to the valves 106 and 112, respectively. A cylindrical body 152 is slidably mounted in the cylinder 144 and is spring biased toward an upper position by a compression spring 154. The body 152 has a peripheral groove 156 therein which extends axially of the body 152 and circumferentially through approximately 90° so that the body 152 rotates 90° as it is moved downwardly into the cylinder 144. A key 158 is mounted in a notch in the top of the cylinder 144 held in place by a threaded cap 160, and the key engages in the slot 156 for rotating the body 152 as described above.

As indicated below, the milking claw (not shown) is supported on top of the body 152 so that the claw is automatically pulled off of the cow and swung out of the milking stall when vacuum is applied to the cylinder 144 by opening of the valve 112.

Automatic stripping of the claw is provided by the mounting of the claw on an upper T-shaped frame 162 which is supported in a cylindrical recess 164 in the top of the body 152 by a piston 166. The piston 166 carries a peripheral O-ring 168 and is non-rotatably mounted in the body 152 by a keyed washer 170 which is held in place by a threaded cap 172 and engages an axially extending keyway 174 in the shank of the piston 166. The piston 166 is spring biased toward an upper position by spring 176 and may be pulled downwardly to a predetermined distance by the application of vacuum to its undersurface through passageway 176 in body 152, and through a passageway 178 in a stem 180 which is provided on the plug 146 and slides into the passageway 176 when the body 152 is pulled downwardly. As illustrated in FIG. 7, O-rings 182 and 184 are provided around the body 152 and the stem 180. The T-shaped top portion 162 supports the claw of the milking apparatus on one of its ends and preferably supports a counterweight on its other end, and where desirable any means may be provided for adjusting the length of the T-shaped portion 162 in a horizontal direction to adapt the apparatus to cows who stand further away from the walls of the milking stall, in this regard the stall entrance gate and stall front wall or manger may be adjustably positioned to crowd all cows to the same position with their udders properly located for milking. Additionally, the claw may be adjustable in height to adapt it to the different cows.

*Operation*

It will be apparent from the above description that this apparatus may be operated substantially completely automatically by one man leaving the operator only the tasks of drying the cow's udder, priming each teat, placing the milking claw on the cow, and inspecting the cow's udder. Obviously, it is undesirable to eliminate the operator since inspection of the cows for disease and the like is absolutely necessary and since it is often desirable to permit the operator to override automatic handling of the cows, first, and adapt the equipment to individual cows and to remove from the automatic pattern cows which may be diseased or required special care. In this regard it will be noted in FIGS. 1 and 2 that a pair of holding stalls 186 are provided on opposite sides of each of the prepreparation stalls 46; these holding stalls are provided with entrance gates 188 which may be power operated from the operator's pit. When the operator inspects a cow in one of the milking stalls and sees that it needs special care, he may release it from the milking stall prior to milking and hold it in one of the holding stalls 186 until after the remainder of the herd has been milked.

When the apparatus illustrated herein is employed for the milking of a large herd, the gates 38 are opened to permit the cows to enter the two corrals 24 and 26 while the crowding gates 34 have been swung over to positions near the gates 38 and the crowding gates are then released to crowd cows toward the entrance openings 28 and 30 into the two milking parlors.

After the milking operation has progressed to the point where cows are being milked in all of the milking stalls 18 and 20, and when the Clegg milking apparatus indicates that one of the cows is through milking, for instance, a cow in a stall 18, the flashing red light goes on causing the pulse counter 100 to index to a position for energizing its relay. At this time, the relay will close starting operation of the delay timer 114 and opening the auto-stripper valve 106 so that the piston 166 in FIG. 6 and the milking claw which is mounted upon it are pulled downwardly through a predetermined distance to stretch the cow's udder. The cow's udder is stretched in this manner while the twenty second interval of timer 114 elapses so that the milking machine withdraws from the udder any milk which has been trapped. When the twenty second time interval elapses, the timer 114 energizes the three valves 62a, 110 and 112. When the valve 112 opens, the body 152 in FIG. 6 is pulled downwardly so that the milking claw is pulled off of the cow and the claw is swung out of the milking stall. Simultaneously, the valve 110 shuts off the vacuum supply to the claw itself so that the claw releases the udder so that foreign matter is not drawn into the claw. Finally, the opening of valve 62a at this time opens the exit gate 58 of the stall so that the cow is released to move into one of the exit aisles and hence return to the pasture.

As the cow moves out of the milking stall 18, the milking stall switch 92 closes to energize its relay. At this time, the relay associated with the stall pulse counter is deenergized to close the milking stall exit gate 62a, and the milking stall entrance gate valve 60a is energized to open the gate 56. The third set of contacts on this relay connects the preparation stall exit gate valve 78a to ground to permit the preparation stall exit gate to open if the two minute delay timer period has expired.

The pulloff valve 112 and milking vacuum shutoff valve 110 are self-locking valves so that their conditions remain unchanged when the cow moves out of the milking stall, and the operator resets them manually when the next cow enters and the claw is attached.

During the third thirty second time interval which is timed by the two minute delay timer 104, the letdown stimulating water valve 140a is opened to stimulate the cow in the preparation stall with sprays of warm water, and after the two minute period expires, the preparation stall exit gate valve 78a opens to open the stall gate 72 and permit the cow to move from the preparation stall 44 into the now vacant milking stall 18.

When the prepared cow leaves the preparation stall 44, the preparation stall switch 96 closes to energize its relay, and the closing of its relay opens the preparation stall entrance gate valve 70a and the prepreparation stall exit gate valve 90a. Simultaneously, the preparation stall exit gate valve 78a is deenergized to close the gate 72, and a cow advances from the prepreparation stall 46 into the preparation stall 44. When the preprepared cow enters the preparation stall 44, the switch 96 opens to close the gate 64 and gate 82.

When the cow leaves the prepreparation stall 46, the switch 98 opens opening the prepreparation stall entrance gate valve 88a and disconnecting the source of wash water by way of valve 134a while the gate is open. A cow then enters the prepreparation stall 46 opening the switch 98, closing the entrance gate to that stall and starting operation of the washing apparatus of FIG. 3.

In this manner, cows are advanced sequentially from the holding corral through the prepreparation stall 46, one of the preparation stalls 44, and one of the milking stalls 18 and 20. With a typical herd, this sequence may progress so that each cow spends approximately four minutes in a milking stall, two minutes in a preparation stall, and one minute in the prepreparation stall. Generally speaking, this automatic sequence works very well for handling the cows in a smooth and steady stream while giving to each cow proper handling for most efficient milking. Some cows milk faster or slower than others, and some herds milk faster and slower than others, and for this reason the timers indicated above are preferably adjustable to permit the apparatus to be adapted to different cows and different herds. Additionally, substantially all of the automatic controls are preferably provided with manually override switches by which the operator can exercise direct control over all elements as he desires. These manual switches may be added to the circuit arrangement illustrated, but for simplicity of illustration are not shown and are often available as a built-in feature in the controls which are illustrated.

While certain specific embodiments of the invention have been illustrated and described in detail above, it is obvious that many modifications thereof may be made without departing from the spirit and scope of the invention.

What is claimed is:

1. In a milking barn having a milking stall where a cow may be milked and an entrance passageway through which cows move into said milking stall, the improvement comprising gate means in said passageway defining a preparation stall through which a cow must move to enter said milking stall, let-down stimulating means including a discharge nozzle mounted adjacent to said preparation stall for applying to the udder of a cow therein confined a stream of fluid which massages the udder as it impinges upon it, and control means for intermittently operating said stimulating means to apply said fluid to each cow's udder automatically when the cow is in said preparation stall.

2. In a milking barn having a milking stall where a cow may be milked and an entrance passageway through which cows move into said milking stall, the improvement comprising gate means in said entrance passageway defining a preparation stall and a prepreparation stall in said passageway through which a cow must move in sequence to enter said milking stall, washing means mounted adjacent to said prepreparation stal for automatically washing the cow therein in areas including the udder with a spray of water, and letdown stimulating means including fluid discharging means of small diameter mounted adjacent to said preparation stall for automatically massaging the udder of a cow therein with a stream of fluid which is warmer than said spray of water.

3. The apparatus of claim 2 characterized further in that stimulating means comprises a plurality of water discharge nozzles mounted adjacent to said preparation stall for directing streams of warm water against a cow's udder with said nozzles constructed to deliver confined streams of water which massage the udder as they impinge upon it.

4. A milking barn comprising an operator's pit, a pair of milking aisles extending along opposite sides of said pit, milking means mounted adjacent to said pit for milking cows in said aisles, an entrance into said barn, a Y-shaped passageway extending from said entrance to said aisles through which cows must move to enter said aisles, said passageway containing a pair of preparation stalls on the arms of its Y-shape and adjacent to said pit with each preparation stall leading into one of said aisles, said passageway also containing a prepreparation stall on the base of its Y-shape and leading into said preparation stalls, washing means mounted adjacent to said prepreparation stall for automatically washing a cow therein in areas including the udder with a spray of water, and letdown stimulating and massaging means mounted adjacent to each of said preparation stalls for automatically spraying the udder of a cow therein with a stream of fluid which is warmer than said spray of water.

5. The barn of claim 4 in which each of said stimulating means comprises a plurality of water discharge nozzles mounted adjacent to said preparation stall for directing streams of warm water against a cow's udder with said nozzles constructed to deliver confined streams of water which massage the udder as they impinge upon it.

6. The barn of claim 4 characterized further by the inclusion of at least two milking stalls in each of said aisles with the stalls in each aisle positioned generally end to end and having front gates out of which a milked cow may pass and rear gates through which a cow to be milked may enter, front and rear gates on said preparation stalls, a front gate on said prepreparation stall, means for opening the front gate of each of said preparation stalls responsive to the opening of the rear gate of one of the milking stalls in the aisle to which said preparation stall leads, means for opening the front gate of said prepreparation stall responsive to the opening of the rear gate of either of said preparation stalls, and means for closing each of the gates of said preparation stalls and said preparation stall after a cow has passed therethrough.

7. The barn of claim 6 characterized further by the inclusion of a manger in each of said preparation stalls movable out of said stalls when the exit gates thereof open, and feed dispensing means for delivering feed automatically to said mangers when said mangers are outside of said stalls.

8. A milking barn comprising:
(A) an operator's station,
(B) a plurality of milking stalls adjacent to said operator's station with each of said stalls having an exit gate,
(C) milking means mounted adjacent to each of said stalls at said operator's station for milking a cow in said stall with each of said milking means having
 (1) a claw for engaging the teats of a cow,
 (2) holding means for holding the claw on the teats of a cow, and
 (3) measuring means for measuring the flow of milk given by the cow,
(D) means for automatically withdrawing said claw from the stall when said claw is not held on the teats of a cow by said holding means, and
(E) release means for releasing said holding means responsive to predetermined operation of said measuring means.

9. The apparatus of claim 8 characterized further by the inclusion of
(F) means for automatically pulling said claw downwardly for a predetermined period of time after said predetermined operation of said measuring means and prior to operation of said release means.

10. In apparatus for automatically milking cows having a claw for engaging the teats of a cow, means for holding said claw on the teats of the cow, and measuring means connected to said claw for receiving the cow's milk from the claw and measuring the flow thereof, the improvement comprising release means for releasing said holding means, support means connected to said claw for supporting said claw below a cow and automatically withdrawing said claw away and from below said cow when said release means is operated, and control means connected to said release means for operating said release means automatically responsive to predetermined operation of said measuring means.

11. The improved apparatus of claim 10 characterized further by the inclusion of stripping means connected to said support means for automatically pulling said claw downwardly to stretch the cow's udder for a predetermined period of time after said predetermined operation of said measuring means and prior to operation of said release means.

12. In apparatus for automatically milking cows having a claw for engaging the teats of a cow, a vacuum conduit connected to said claw for withdrawing milk from said claw and holding said claw on the teats of a cow, and measuring means operable periodically for indicating the periodic accumulation of a predetermined quantity of milk withdrawn from said claw, the improvement comprising a valve operable to close said vacuum conduit, support means for supporting said claw beneath a cow when said claw is held on the cow's teats and automatically withdrawing said claw away and from beneath the cow when said claw is released from the cow's teats, and control means interconnecting said measuring means and said valve for operating said valve upon the lapse of a predetermined time between the periodic operations of said measuring means.

13. The apparatus of claim 12 characterized further by the inclusion of stripping means forming a portion of said support means and connected to said control means for automatically pulling said claw downwardly through a predetermined distance at a predetermined time prior to time said valve is operated by said control means.

14. The apparatus of claim 10 characterized further in that said support means comprises a base cylinder, a body member telescopically mounted in said base for vertical movement between upper and lower positions, cam means interconnecting said base and said body member for rotating said body member at least 90 degrees when said body member moves from said upper position to said lower position, and mounting means for mounting said claw on said body member eccentrically of the axis of rotation of said body member; and said control means includes means for moving said body from said upper position to said lower position when said valve is operated.

15. A milking barn comprising
(A) an operator's pit,
(B) a pair of aisles extending along opposite sides of said pit,
(C) a pair of milking stalls mounted in each of said aisles positioned generally end to end with respect to each other along the side of said pit and each having entrance and exit gates for controlling the passage of a cow therethrough from and to said aisle,
(D) an entrance into said barn,
(E) a Y-shaped passageway extending from said entrance to said aisles, said passageway having
 (1) a pair of preparation stalls on the arms of its Y-shape and adjacent to said pit with each of said preparation stalls having entrance and exit gates for controlling the passage of cows therethrough from the base of its Y-shape to one of said aisles, and
 (2) a prepreparation stall on the base of its Y-shape and having entrance and exit gates for controlling the passage therethrough of cows moving from said entrance to said preparation stalls,
(F) washing means mounted adjacent to said prepreparation stall for automatically washing a cow therein in areas including the udder with a spray of water, (G) letdown stimulating and massaging means mounted adjacent to each of said preparation stalls for automatically spraying the udder of a cow therein with a stream of fluid which is warmer than said spray of water, (H) milking means mounted adjacent to each of said milking stalls at said operator's pit for milking a cow in said stall with each of said milking means having
   (1) a claw for engaging the teats of a cow,
   (2) holding means for holding the claw on the teats of a cow,
   (3) measuring means for measuring the flow of milk given by the cow,
   (4) support means connected to said claw for supporting the claw underneath a cow in said stall when said claw is held on the cow's teats by said holding means and automatically withdrawing the claw from the stall when the claw is not held on the cow's teats by said holding means, and
   (5) release means for releasing said holding means responsive to predetermined operation of said measuring means, and (I) stall gate control means interconnecting said release means and said stall gates for opening the exit gate of one of said milking stalls and automatically advancing cows through said prepreparation stall and one of said preparation stalls to said one milking stall responsive to operation of the release means at said one milking stall.

References Cited by the Examiner

UNITED STATES PATENTS

| | | | |
|---|---|---|---|
| 1,186,913 | 6/1916 | Kremser | 119—159 |
| 1,767,560 | 6/1930 | Snyder | 119—159 |
| 1,968,564 | 7/1934 | Luks | 119—14.04 |
| 2,228,698 | 1/1941 | Fitches | 119—1 |
| 2,238,872 | 4/1941 | Mather et al. | 119—159 |
| 2,305,259 | 12/1942 | Jeffers | 119—14.04 |
| 2,358,000 | 9/1944 | Cornell | 119—14.04 |
| 2,532,088 | 11/1950 | Cordis | 19—1 |
| 2,593,597 | 4/1952 | Palmer | 119—27 |
| 2,671,428 | 3/1954 | Hill | 119—14.03 |
| 2,689,546 | 9/1954 | Petri | 119—14.03 |
| 2,737,922 | 3/1956 | Magness | 119—14.03 |
| 2,775,224 | 12/1956 | Rawson et al. | 119—14.13 |
| 2,814,271 | 11/1957 | Black | 119—55 |
| 2,900,957 | 8/1959 | Peterson | 119—159 |
| 3,033,161 | 5/1962 | Babson | 119—14.13 |
| 3,108,574 | 10/1963 | Albers | 119—159 |
| 3,115,116 | 12/1963 | Schilling et al. | 119—14.08 |
| 3,127,871 | 4/1964 | Jorgensen | 119—14.03 |

SAMUEL KOREN, *Primary Examiner.*

ALDRICH F. MEDBERY, *Examiner.*